Figure 1:
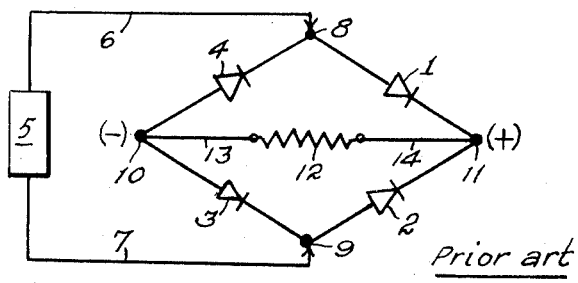

United States Patent
Gourse

[15] 3,700,999
[45] Oct. 24, 1972

[54] AUTOMATIC BATTERY POLARIZING CIRCUIT

[72] Inventor: Stanley J. Gourse, Columbia, Md.

[73] Assignee: The United States of America as represented by the Secretary of the Army

[22] Filed: Jan. 11, 1972

[21] Appl. No.: 216,935

[52] U.S. Cl..................320/26, 321/47, 323/75 E
[51] Int. Cl...............................................H02j 7/00
[58] Field of Search..........321/8, 47, 48; 320/25, 26; 323/22 T, 75 E; 307/291

[56] References Cited

UNITED STATES PATENTS

| | | | |
|---|---|---|---|
| 2,821,639 | 1/1958 | Bright et al | 323/75 E |
| 3,233,161 | 2/1966 | Silkorra | 323/75 E |
| 3,434,034 | 3/1969 | Garber et al | 321/47 |
| 3,593,101 | 7/1971 | Wassink | 320/25 |

Primary Examiner—J. D. Miller
Assistant Examiner—Robert J. Hickey
Attorney—Harry M. Saragovitz

[57] ABSTRACT

Disclosed is and automatic battery polarizing circuit employing transistors in the arms of a bridge circuit configuration wherein the transistors are operative to couple a battery connected to the input thereof in a manner that the bridge output voltage will always be of the same polarity regardless of how the battery is connected to the bridge input with respect to polarity.

5 Claims, 2 Drawing Figures

INVENTOR,
Stanley J. Gourse

BY: Harry M. Saragovitz,
Edward J. Kelly &
Herbert Berl      ATTORNEYS.

AUTOMATIC BATTERY POLARIZING CIRCUIT

The advent of microelectronic circuit techniques has led to the development of much battery operated tactical equipment. One problem unique to tactical equipment is that of battery replacement under adverse conditions. It is desirable to be able to replace batteries quickly under all tactical conditions such as rainfall, darkness, and while under fire.

In prior practice, bridge-rectifier circuit configurations using diodes in a well known manner in the arms thereof provided means whereby the output voltage thereof would always be of the same polarity regardless of how the battery was connected to the input of the bridge. However, such a circuit configuration employing diodes has an inherent disadvantage in that its output voltage will always be two diode voltage drops below the battery voltage. This voltage drop can be a significant percentage of the terminal voltage of low voltage batteries, for example, diode bridge-rectifier battery polarizing means are employed.

An object of the invention is a new and novel automatic battery polarizing circuit.

Another object of the invention is a new and novel circuit which couples a battery to a load and produces correct polarity thereto without regard to the battery polarity.

A further object of the invention is an automatic battery polarizing circuit employing transistors in a bridge-rectifier circuit configuration.

A still further object of the invention is an automatic battery polarizing circuit wherein the voltage drop thereacross is insignificant in regard to the battery terminal voltage.

Figure 2:
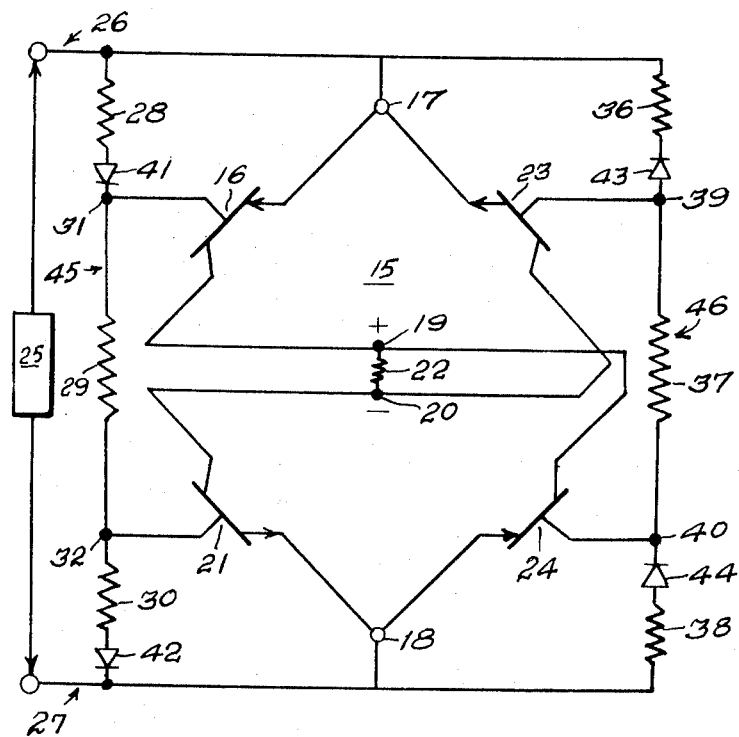

The novel features that are considered characteristic of the invention are set forth with particularity in the appended claims. The invention itself, however, both as to its organization and mode of operation as well as additional objects and advantages thereof will best be understood from the following description when read in conjunction with the accompanying drawings in which:

FIG. 1 is a schematic diagram of a prior art automatic battery polarizing circuit; and FIG. 2 is a schematic diagram of the automatic battery polarizing circuit of the invention.

FIG. 1 illustrates a prior art battery polarizing circuit employing a bridge-rectifier circuit configuration wherein is incorporated rectifying diodes 1, 2, 3 and 4 in the arms thereof in a well known manner. The battery 5 is coupled without regard to its polarity by means of conductors 6 and 7 to two diagonally opposite junctions 8 and 9 of the bridge, the output voltage being taken between the two diagonally opposite junctions 10 and 11 and coupled to load 12 by means of conductors 13 and 14. Assuming battery 5 has its positive and negative terminals connected to junctions 8 and 9, respectively, current will flow from the battery through junction 8, diode 1, junction 11, load 12, junction 10, diode 3 and junction 9 to the negative terminal of battery 5. Thus, it can be seen that the polarity of junction 11 will be positive and polarity of junction 10 will be negative. Now assuming battery 5 has its positive and negative terminals connected to junctions 9 and 8, respectively, current will flow from the battery through junction 9, diode 2, junction 11, load 12, junction 10, diode 4 and junction 8 to the negative terminal of the battery. Thus, it can be seen that the polarities of junctions 11 and 10 will again be positive and negative, respectively. Although such a bridge-rectifier device will produce an output having the same polarity position at all times regardless of how the battery is connected to the bridge, it has a distinct inherent disadvantage in that the output voltage will be less than the terminal voltage of the battery due to voltage drops across diodes 1 and 3 or diodes 2 and 4. It has been found that these voltage drops present a great disadvantage particularly when low voltage batteries are used. These drops are a significant percentage of the total battery voltage.

Referring now to FIG. 2, the automatic battery polarizing circuit of the invention comprises a transistor-bridge 15 wherein each arm thereof consists of a transistor. A PNP transistor 16 comprising one arm of the bridge has its emitter connected to junction 17 of the diagonally disposed junctions 17 and 18 comprising input terminals of the bridge and its collector to terminal 19 of output terminals 19 and 20 which bear polarity identification of plus and minus, respectively, and across which is coupled the load 22. A NPN transistor 21 comprising a second arm of the bridge has its collector connected to negative terminal 20 and its emitter to junction 18. A NPN transistor 23 comprising a third arm of said bridge adjacent the first arm has its emitter connected to junction 17 and its collector to negative terminal 20. A PNP transistor 24 comprising a fourth arm of the bridge adjacent said second arm has its collector connected to the positive terminal 19 and its emitter to junction 18. The battery 25 which is the source of energy for powering load 22 and which is also utilized to energize the transistors of the bridge is coupled thereto at the input terminals 17 and 18 by means of conductors 26 and 27. A voltage divider 45 consisting of series connected resistors 28, 29 and 30 connected between input terminals 17 and 18 and hence across battery 25 via conductors 26 and 27 provide a bias network for transistors 16 and 21. The base of transistor 16 is connected to the junction 31 between resistors 28 and 29 and the base of transistor 21 is connected to the junction 32 between resistors 29 and 30. A voltage divider 46 consisting of series connected resistors 36, 37 and 38 connected between input terminals 17 and 18 and hence across battery 25 via conductors 26 and 27 provides a bias network for transistors 23 and 24. The base of transistor 23 is connected to the junction 39 between resistors 36 and 37 and the base of transistor 24 is connected to the junction 40 between resistors 37 and 38. In each said bias network, diodes are included to isolate the two "off" transistors and their associated bias network from the battery in order to conserve power as described in the following. In the voltage divider 45, a diode 41 is inserted between resistor 28 and junction 31 and a diode 42 is inserted between resistor 30 and input terminal 18, both poled so that their greatest conductivity is in a direction from terminal 17 to terminal 18. In the voltage divider 46, a diode 43 is inserted between junction 39 and resistor 36 and a diode 44 is inserted between resistor 38 and junction 40, both poled so that their greatest conductivity is in a direction from terminal 18 to terminal 17. Thus, it can be seen that, for example, when the positive pole of battery 25 is connected to input terminal 17 and its negative pole to input terminal 18 current will flow through the voltage divider 45 and transistors 16 and 21 will be energized and each will go into saturation while current flow in the voltage divider 46 will be blocked and transistors 23 and 24 will not only remain in the "off" state, but they along with the voltage divider 46 which provides the related bias network will be isolated from battery 25 thereby conserving power. It is obvious from the foregoing that when the negative pole of battery 25 is connected to input terminal 17 and its positive pole to input terminal 18 current will flow through the voltage divider 46 and transistors 23 and 24 will go into saturation while current flow in the first voltage divider 45 will be blocked and transistors 16 and 21 will therefore be in an "off" state and isolated along with voltage divider 45 from battery 25.

In operation, disregarding for the moment diodes 41-44 and assuming that the positive pole of battery 25 is connected to input terminal 17 and the negative pole thereof to input terminal 18 with load 22 connected between output terminals 19 and 20, the positive and negative output terminals, respectively, PNP transistor 16 and NPN transistor 21 will be turned on into saturation by the bias supplied by voltage divider 45 whereby input terminal 17 is coupled by transistor 16 to the positive output terminal and input terminal 18 is coupled by transistor 21 to negative output terminal 20. Transistors 23 and 24 are reversed biased through voltage divider 46 when the plus and minus terminals are connected to input terminals 17 and 18, respectively, and therefore are in the "off" state whereby they provide no switching action for coupling battery 25 to output terminals 19 and 20. When the negative pole of battery 25 is connected to input terminal 17 and the positive pole thereof to input terminal 18, transistors 16 and 21 will be in the "off" state due to the bias supplied by voltage divider 45 and transistors 23 and 24 will be turned on into saturation by the bias voltages of voltage divider 46 whereby transistor 23 couples input terminal 17 to the negative output terminal 20 and transistor 24 couples input terminal 18 to the positive output terminal 19. Thus, it can be seen that the voltage polarity at the output terminals will remain the same regardless of the polarity orientation of the battery at the input terminals of the transistor bridge.

The only circuit requirements are that enough bias be supplied to keep the conducting transistors in saturation when the supply is delivering maximum current. From a power consumption standpoint, this means that high gain transistors should be used to minimize power loss in the bias networks.

I claim:

1. An automatic battery polarizing circuit comprising in combination:
    a bridge type control circuit having a pair of input terminals and a pair of output terminals;
    a first PNP transistor switch connected between one of said input terminals and one of said output terminals;
    a first NPN transistor switch connected between the other of said input terminals and the other of said output terminals;
    a second NPN transistor switch connected between said one of said input terminals and said other of said output terminals;
    a second PNP transistor switch connected between said other of said input terminals and said other of said output terminals;
    an electrical load connected between said output terminals;
    and a battery connected between said input terminals;
    a first and a second voltage divider connected between said input terminal;
    said first PNP transistor switch and said first NPN transistor switch biased into saturation through said first voltage divider coupled between said input terminals when the positive pole of said battery is connected to said one of said input terminals and the negative pole connected to the said other of said input terminals whereby said positive pole is connected to said one of the output terminals and the negative pole is connected to the said other of the output terminals, said second NPN transistor switch and said second PNP transistor switch being biased off through said second voltage divider connected between said input terminals, and when the positive pole of the battery is connected to said other of the input terminals and the negative pole to said one of the input terminals said second NPN transistor switch and said second PNP transistor switch are biased into saturation through the second voltage divider whereby said positive pole is connected to said one of the output terminals and said negative pole is connected to said other of the output terminals, said first PNP transistor switch and said first NPN transistor being biased off through the first voltage divider;
    and means for isolating said transistor switches from the battery when in an off condition.

2. The invention in accordance with claim 1 wherein each said voltage divider comprises first, second and third series connected resistors, the first resistor of each said divider being connected to said one of the input terminals, and the third resistor of each said divider being connected to said other of the input terminals.

3. The invention in accordance with claim 2 wherein:
    said first PNP transistor switch consists of a PNP transistor having an emitter connected to said one of the input terminals, a collector connected to said one of the output terminals and a base connected to a first junction formed between the first and second resistors of said first voltage divider;
    said first NPN transistor switch consists of a NPN transistor having an emitter connected to said other of the input terminal, a collector connected to said other of the output terminals and a base connected to a second junction formed between the second and third resistors of said first voltage divider;
    said second NPN transistor switch consists of a NPN transistor having an emitter connected to said one of the input terminals, a collector connected to said other of the output terminals and a base connected to a fourth junction formed between the second and third resistors of said second voltage divider; and said second NPN transistor switch consists of a NPN transistor having an emitter connected to said one of the input terminals, a collector connected to said one of the output terminals and a base connected to a fifth junction formed between said second and third resistors of said second voltage divider.

4. The invention in accordance with claim 1 and said means for isolating said first PNP transistor switch, said first NPN transistor switch and said first voltage divider from said battery when said last recited transistor switches are in the off condition, comprising a first diode coupled in said first voltage divider between said first resistor and said first junction thereof, and a second diode coupled in said first voltage divider between the third resistor thereof and said other of the input terminals, said first and second diodes being poled in the first voltage divider in a manner that their greatest conductivity is in a direction from said one to the other of the input terminals.

5. The invention in accordance with claim 1 and said means for isolating said second NPN transistor switch, said second PNP transistor switch and said second voltage divider from said battery when said last recited transistor switches are in the off condition, comprising a third diode coupled in said second voltage divider between said third resistor and said third junction thereof, and a fourth diode coupled in said second voltage divider between said fourth junction and said first resistor thereof, said third and fourth diodes being poled in the second voltage divider in a manner that their greatest conductivity is in a direction from said other to said one of the input terminals.

* * * * *